United States Patent
Fan

(10) Patent No.: US 6,580,820 B1
(45) Date of Patent: Jun. 17, 2003

(54) DIGITAL IMAGING METHOD AND APPARATUS FOR DETECTION OF DOCUMENT SECURITY MARKS

(75) Inventor: Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/328,481

(22) Filed: Jun. 9, 1999

(51) Int. Cl.[7] .......................... G06K 9/00; G03G 21/04
(52) U.S. Cl. ..................................... 382/135; 399/366
(58) Field of Search ................................ 382/135, 137, 382/138, 101, 216, 184, 218–221, 286; 283/72, 114, 902; 399/366; 386/94; 705/57, 58

(56) References Cited

U.S. PATENT DOCUMENTS

| | | | | |
|---|---|---|---|---|
| 4,482,971 A | * | 11/1984 | Blazek ........................ | 382/135 |
| 5,067,162 A | * | 11/1991 | Driscoll et al. ............. | 382/126 |
| 5,216,724 A | * | 6/1993 | Suzuki et al. ............... | 382/135 |
| 5,781,653 A | | 7/1998 | Okubo | |
| 6,011,866 A | * | 1/2000 | Donelly et al. ............. | 382/135 |
| 6,067,374 A | * | 5/2000 | Fan et al. .................... | 382/135 |
| 6,091,844 A | * | 7/2000 | Fujii et al. .................. | 382/135 |
| 6,115,494 A | * | 9/2000 | Sonoda et al. .............. | 382/135 |
| 6,167,147 A | * | 12/2000 | Mowry, Jr. et al. ......... | 382/135 |
| 6,272,245 B1 | * | 8/2001 | Lin ............................. | 382/135 |
| 6,289,125 B1 | * | 9/2001 | Katoh et al. ................ | 382/135 |
| 6,351,550 B1 | * | 2/2002 | Inaoka et al. ............... | 382/100 |
| 6,393,140 B1 | * | 5/2002 | Itako .......................... | 382/135 |
| 6,470,096 B2 | * | 10/2002 | Davies et al. ............... | 382/203 |

FOREIGN PATENT DOCUMENTS

| | | |
|---|---|---|
| EP | 0 608 188 A2 | 7/1994 |
| EP | 0 664 642 A2 | 7/1995 |
| EP | 0 675 631 A2 | 10/1995 |
| EP | 0 751 475 A2 | 1/1997 |
| EP | 0 789 270 A1 | 8/1997 |

* cited by examiner

Primary Examiner—Amelia M. Au
Assistant Examiner—Martin Miller
(74) Attorney, Agent, or Firm—Fay, Sharpe, Fagan, Minnich & McKee, LLP

(57) ABSTRACT

A method and apparatus for preventing or inhibiting effective reproduction of documents such as currency, checks, stock certificates, and any other printed document including a pre-defined security mark printed therein. The subject method and apparatus operate to effect a multi-step review of all digital image data acquired from a printed document to be reproduced for purposes of locating any potential security marks and further examining same for purposes of positively identifying a potential security mark as an actual security mark. If a mark is located and verified to be an authentic security mark, effective reproduction of the printed document will not be permitted and/or other security measures will be taken.

6 Claims, 11 Drawing Sheets

FIG. 2A
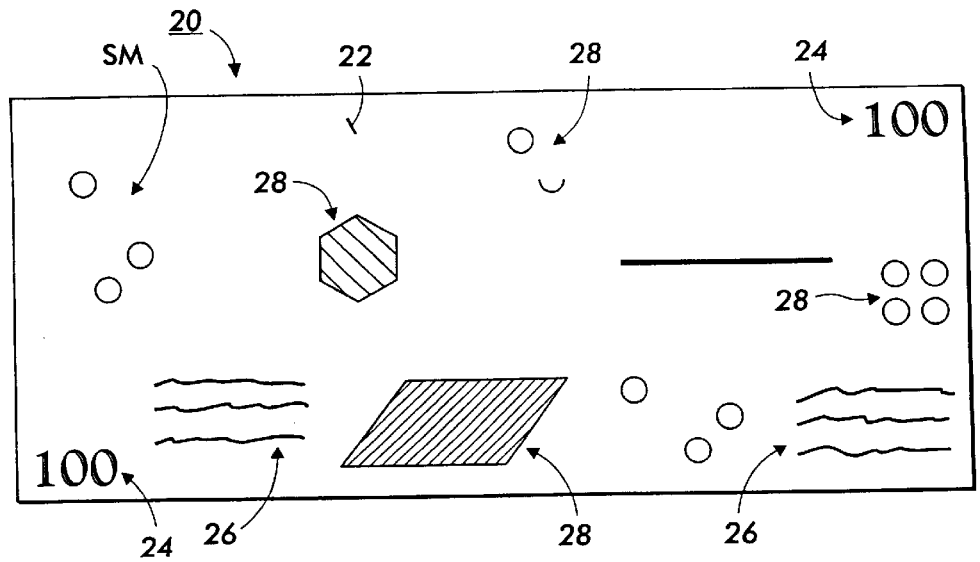
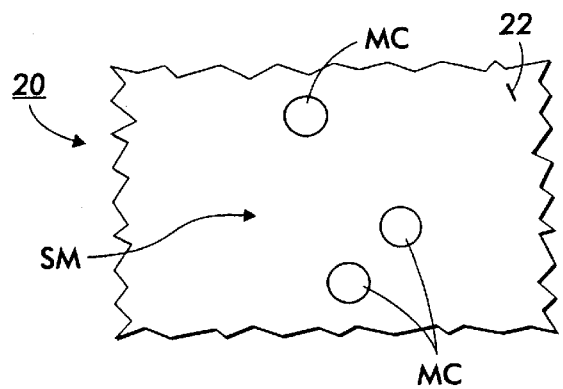
FIG. 2B
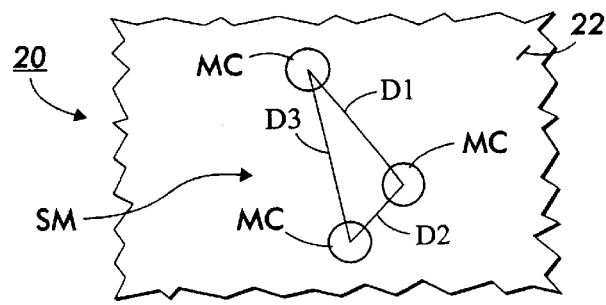
FIG. 2C

DIGITAL IMAGING METHOD AND APPARATUS FOR DETECTION OF DOCUMENT SECURITY MARKS

BACKGROUND OF THE INVENTION

The present invention relates to the digital image processing arts. More particularly, the application relates to a method and apparatus for preventing or inhibiting effective reproduction of documents such as currency, checks, stock certificates, and any other printed document including a pre-defined security mark printed therein. The subject method and apparatus operate to effect a multi-step review of all digital image data acquired from a printed document to be reproduced for purposes of locating any potential security marks and further examining same for purposes of positively identifying a potential security mark as an actual security mark. If a mark is located and verified to be an authentic security mark, effective reproduction of the printed document will not be permitted and/or other security measures will be taken.

The proliferation of digital image processing systems, such as digital color copiers, that are able to make very high quality reproductions or "copies" of color documents at a low cost has led to use of these machines by criminals for reproduction of currency, checks, stock certificates, legal documents, and other printed documents not legally reproducible. Obviously, any reproductions of these documents are counterfeit and illegal. Unfortunately, there has heretofore not been found a method or apparatus for effectively and efficiently detecting the attempted reproduction of currency and the like so that the reproduction may be thwarted. Without an effective an efficient method/apparatus for detecting currency and other non-reproducible documents, criminals have often been able to produce counterfeit documents almost at will.

Many difficulties are presented during the attempted identification of a security mark in a printed document. The documents, such as currency, are often significantly worn. Also, the document may be placed in the reproduction apparatus at an irregular angle or location that renders detection of the security mark more difficult. Also, improper or erroneous detection of a security mark, and any resulting operations to prevent duplication of the document, are likely to upset and inconvenience those attempting to make legitimate reproductions. Accordingly, erroneous detection of a security mark in a document must be minimized.

Based upon the foregoing and other considerations, a need has been found for a new and improved digital imaging method and apparatus for detection of document security marks to prevent production of counterfeit documents. It has been deemed desirable to develop such a method and apparatus that perform this function in an effective and efficient manner, without intrusion into or interruption of legitimate document reproduction efforts.

SUMMARY OF THE INVENTION

In accordance with the present invention, a new and improved digital imaging method and apparatus are provided for effective and efficient detection of document security marks to prevent counterfeiting of documents.

In accordance with a first aspect of the present invention, a method of digital image processing is provided. The method includes, for a printed document potentially including a security mark defined therein by a plurality of actual mark constituents each having a select color, size, and shape and having a select spatial arrangement relative to each other, scanning the document to obtain digital image data corresponding to the printed document, the digital image data defined in terms of a plurality of color input pixel values. The digital image data is processed to identify all portions representing potential constituents of a security mark. For each potential mark constituent represented by the digital image data, it is determined if the potential mark constituent, together with at least one other potential mark constituent represented by the digital image data, defines a potential security mark. For each potential security mark represented in the digital image data, it is determined if the potential security mark represents an actual security mark present in the printed document. In accordance with another aspect of the present invention, a digital image processing method for preventing unauthorized reproduction of a printed document including a security mark defined in terms of a plurality of actual mark constituents having a select color, select dimensions and arranged in a select pattern relative to each other, includes scanning said printed document to derive color digital data representing the printed document, the color digital data defined in terms of a plurality of pixels each having a color value. All pixels of the color digital data having a color value representing a color at least approximating the select color of the plurality of actual mark constituents are identified. A binary map of the color digital data is constructed and defined in terms of "on" and "off" pixels, the "on" pixels corresponding to the identified pixels of the color digital data having color values at least approximating the select color of the plurality of actual mark constituents. The binary map is used to identify potential mark constituents defined by the "on" pixels and to identify at least one neighborhood of plural potential mark constituents together defining a potential security mark. The potential security mark is identified as an actual security mark if the potential mark constituents thereof are uniform relative to each other. If an actual security mark is identified, effective duplication of the printed document is prevented.

In accordance with still another aspect of the present invention, a method of processing digital image data representing a color printed document that includes a security mark for purposes of identifying the security mark represented in the digital image data includes processing the digital image data to identify all portions thereof defining a select color corresponding to the color of the security mark in the printed document. For each portion of the digital image data defining the select color, it is determined if the portion represents a potential constituent of a security mark in the printed document. The method further includes, for each potential security mark constituent identified in the digital image data, determining if the potential security mark constituent, together with at least one other potential security mark constituent, defines a potential security mark. The potential security mark constituents defining each potential security mark are compared to each other to determine if they are uniform in terms of color and size relative to each other. A potential security mark is identified as a security mark represented in the digital image data if the potential security mark constituents of the potential security mark are sufficiently uniform in terms of the least color and size relative to each other.

In accordance with another aspect of the present invention, a document reproduction security method includes scanning a printed document to derive color digital image data representative of the printed document. The digital image data is processed to identify all pixels thereof in a select color range used to define a security mark in the printed document. The digital image data is also processed to identify all connected components comprising only pixels of the digital image data in the select color range. The digital image data is processed to identify, as potential mark constituents, all of the connected components having both a size and shape corresponding to a predefined size and shape of actual mark constituents defining the security mark in the printed document. The digital image data is further processed to establish a neighborhood of a select size about each potential mark constituent and to identify, as a potential security mark, all neighborhoods comprising: (i) a number of potential mark constituents greater than or equal to a minimum and less than or equal to a maximum number of actual mark constituents required to define a security mark; and (ii) potential mark constituents arranged relative to each other in a manner corresponding to the actual mark constituents defining the security mark in the printed document. For each neighborhood identified as a potential security mark, the digital image data is further processed to identify the potential security mark as an actual security mark if the potential mark constituents in the neighborhood are uniform in terms of at least size and color. Effective reproduction of the printed document is prevented if the digital image data includes an actual security mark.

One advantage of the present invention is the provision of a digital imaging document security mark detection method and apparatus that effectively and efficiently detect document security marks upon attempted digital reproduction of a printed document including a security mark to prevent production of counterfeit documents.

A further advantage of the present invention resides in the provision of a digital imaging method and apparatus that minimize false detection of security marks.

Still another advantage is found in the provision of a digital imaging method and apparatus that detect document security marks without regard to shift or rotation of the original document in the document reproduction apparatus.

Still other benefits and advantages of the invention will become apparent to those of ordinary skill in the art upon reading and understanding the specification together with the drawings.

BRIEF DESCRIPTION OF THE DRAWINGS

The invention may take form in various steps and arrangements of steps, and in various components and arrangements of components. The drawings are only for purposes of illustrating preferred embodiments, and it is not intended that they be construed to limit the invention in any way.

FIG. 2A illustrates a printed document such as a currency note, including a security mark;

FIGS. 2B and 2C show enlarged portions of the document illustrated in FIG. 2A for purposes of showing the features of the security mark;

DETAILED DESCRIPTION OF THE PREFERRED EMBODIMENTS

Figure 1:
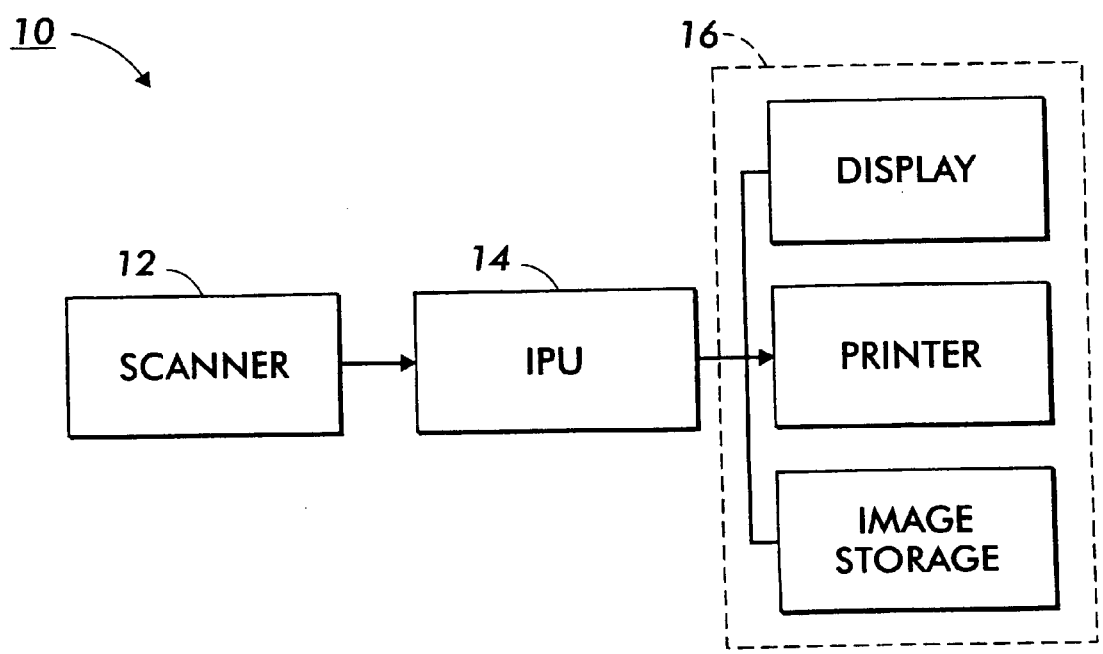
FIG. 1 is a block diagram illustrating an image processing system in accordance with the present invention.

Referring now to the drawings where the showings are for purposes of describing preferred embodiments of the invention only and not for purposes of limiting same, a digital image processing system 10 in accordance with the present invention is shown in FIG. 1. An image input scanner 12 derives and delivers digital image data in the form of one or more monochromatic separations, wherein the picture elements or pixels of each separation are defined at a depth of d bits per pixel where d is an integer. Accordingly, each pixel of each separation is defined in terms of d bits per pixel (bit depth=d), and each pixel has some gray value between full off and full on. When the digital image data is provided in terms of a single monochromatic separation, the image is monochromatic, for example, so called black-and-white image data. On the other hand, when the digital image data is provided in terms of two or more monochromatic separations, a color image results when the data from the separations is combined, for example, red-green-blue (RGB) separations or cyan-magenta-yellow (CMY) separations.

The image signals are input from the scanner 12 to an image processing unit 14 wherein digital image processing, such as security mark identification in accordance with the present invention, is performed. The image processing unit 14 may be provided by any suitable electronic computing apparatus such as an electronic computer, a dedicated electronic circuit, or any other suitable electronic circuit means. The image processing unit 14 outputs data in a suitable format to an image output terminal 16 such as a digital printer and/or visual display. Suitable apparatus for digital image input and/or output include the XEROX Document Center 265DC digital imaging system, Pixelcraft 7650 Pro Imager Scanner, XEROX DocuTech Production Printing System scanners, the XEROX 5775 digital color copier, the XEROX 5760 and 5765 Majestik digital color copiers, or any other suitable color digital scanner/copier. Regardless of the depth d at which each pixel is defined, the location of each pixel in each separation bitmap is also defined, typically in terms of a row "n" and a column "m."

FIG. 2A illustrates a currency note including a security mark imprinted or otherwise included thereon. The illustrated currency note and security mark are for ease of illustrating the invention only, and those of ordinary skill in the art will recognize that the invention is equally applicable to any type of document including any suitable security mark thereon. As noted, checks, stock certificates, bonds, and legal documents are some other examples of documents that may include security marks and that may, consequently, be protected from unauthorized reproduction according to the present invention.

The currency note 20 is printed on paper 22 or other suitable substrate and comprises various markings, such as denomination markings 24, text 26, various decorative images and designs 28, and a security mark SM used to identify the currency note 20 as an authentic document. As illustrated and described herein, the security mark SM is printed in the same or similar manner on the document 20 as the information 24, 26, 28, typically using any suitable color ink.

With reference now to FIGS. 2B and 2C, the portion of the currency note 20 including the security mark SM is illustrated and greatly enlarged to show the characteristics of the security mark SM used in the present example. As noted, in practice, the security mark will likely take any one of a wide variety of alternative forms, and the invention is not to be limited to the illustrated or any other particular security mark. In the present example, the security mark SM is defined on the note 20 (according to a definition promulgated by the appropriate authorities) by three identical mark constituents MC, each having identical size, shape and color according to the security mark definition. Also, the mark constituents MC are arranged in a select pattern or arrangement as required by the definition of the security mark SM. As illustrated herein, the mark constituents MC are circular and arranged at the vertices of a right triangle. The mark constituents MC are separated from each other by the distances D1, D2, D3, to define the security mark SM further as having a select overall size and shape.

The apparatus and method in accordance with the present invention operate the image processing unit 14 to detect the existence of a security mark SM in a document such as the note 20 scanned by the image input scanner 12 so that the image processing unit can prevent or inhibit unauthorized reproduction of the note 20 or other document being scanned. Those of ordinary skill in the art will also recognize that the subject method hand apparatus may be used to determine the authenticity of a document.

Figure 3:
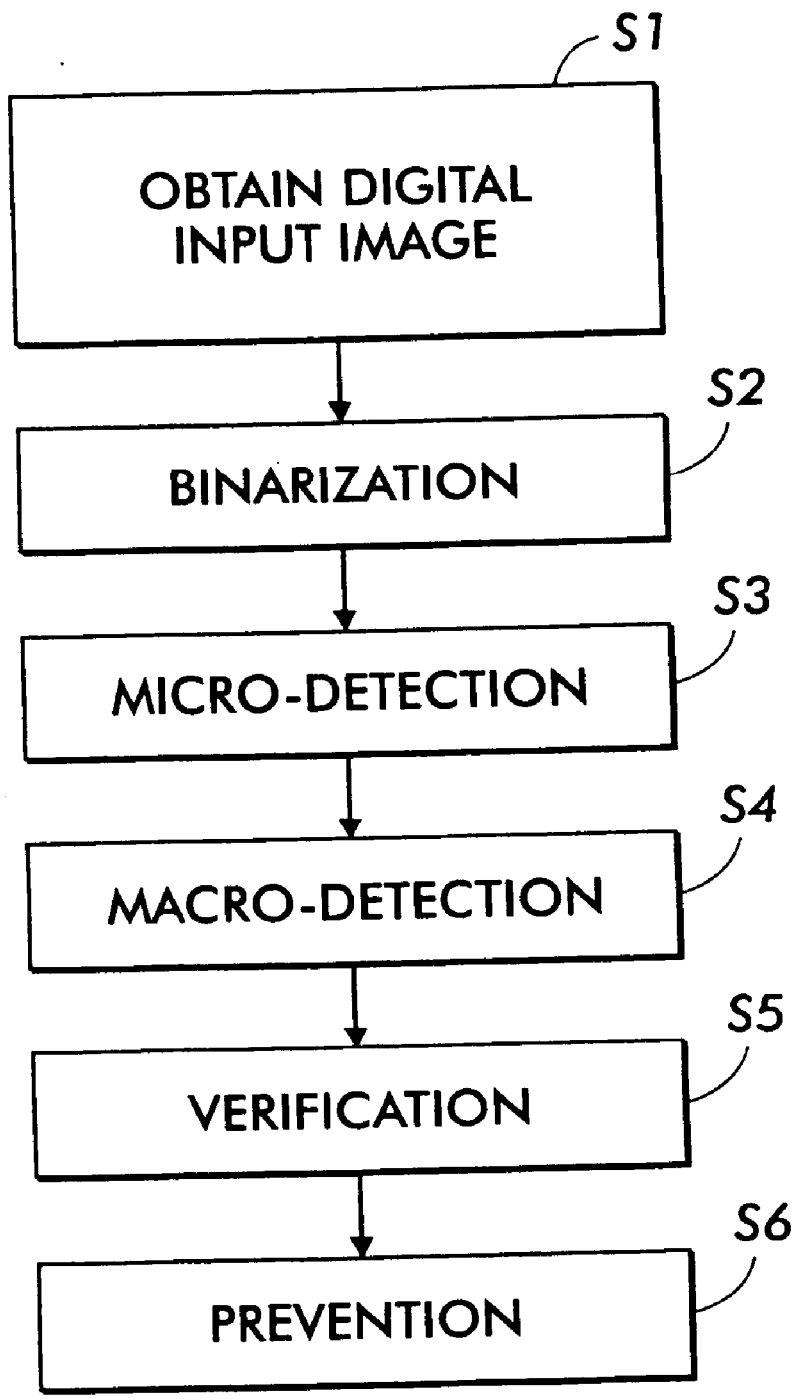
FIG. 3 is a flow-chart illustrating an overall digital image processing method for detecting document security marks in accordance with the present invention.

With reference now to FIG. 3, a preferred digital image processing method for detection of document security marks is illustrated in accordance with the present invention. The security mark detection method as implemented using the digital imaging processing system 10 comprises: S1—obtaining a digital input image, typically through use of the image input scanner 12; S2—binarization of the digital input image; S3 micro-detection; S4—macro-detection; S5—verification; and S6—prevention of the effective reproduction of the input document if a security mark is found. The operations S2 through S6 are preferably carried out in the image processing unit 14.

Figure 4:
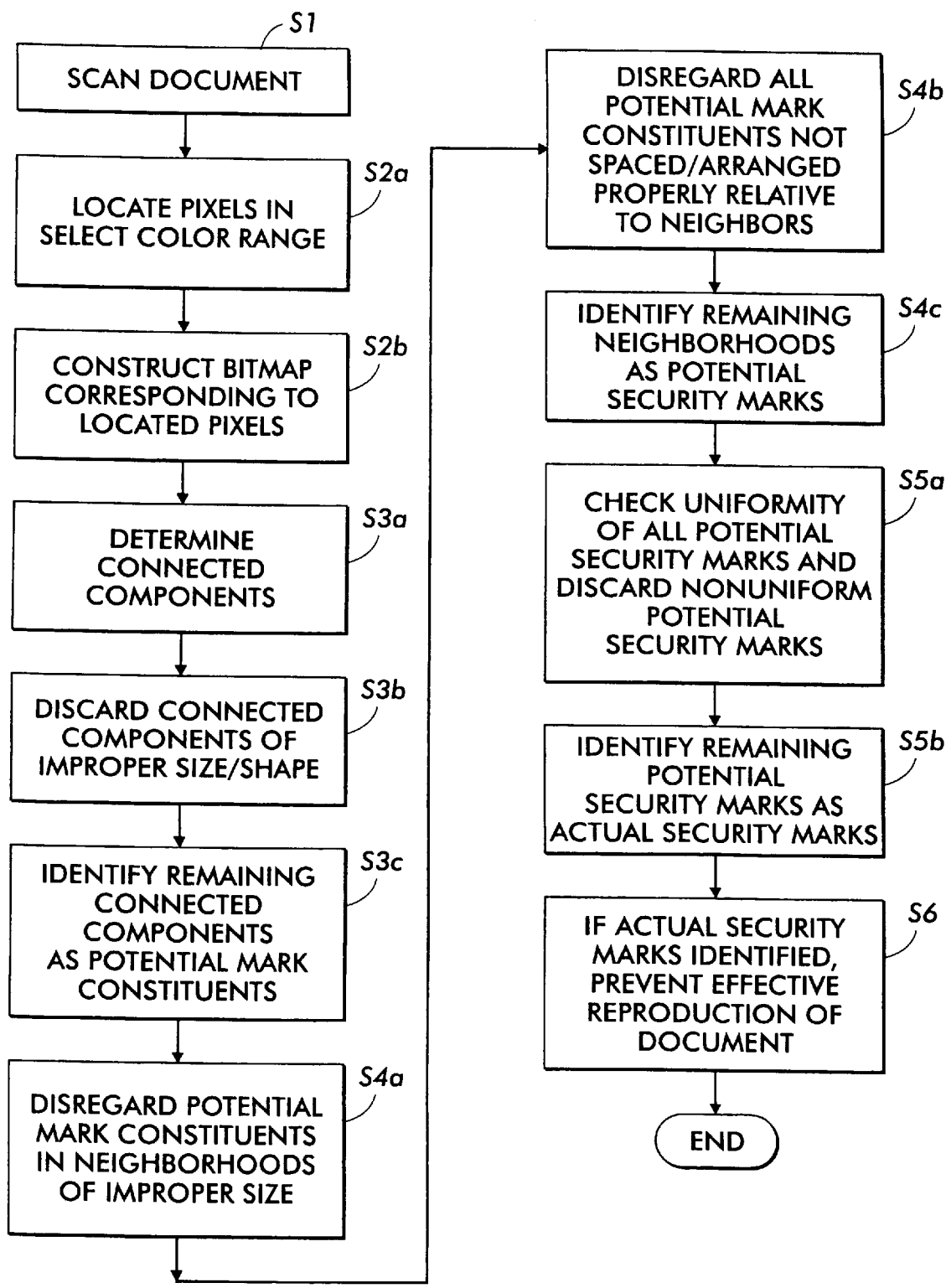
FIG. 4 is a more detailed flow-chart illustrating a digital image processing method of detecting document security marks in accordance with the present invention.

The operations S1–S6 are illustrated in further detail in FIG. 4. The step S1 comprises scanning an input printed document, such as the currency note 20, using the input image scanner 12 to derive color digital image data in terms of multiple color separations in a suitable color space, e.g., red R, green G, blue B, or the like. The scanner 12 may derive or deliver the digital image data in terms of any other suitable color space.

The binarization step S2 comprises a first sub-step S2a of identifying all pixels in the input digital image as derived by the scanner 12 having or representing a color in a select range. A second sub-step S2b constructs a bitmap corresponding to all pixels of the input digital image identified as having a color in the select range.

The micro-detection operation S3 comprises sub-steps S3a–S3c. More particularly, using the bitmap derived from the binarization operation S2, "connected components" in the bitmap are determined S3a, and those of a size or shape not corresponding to a mark constituent MC are discarded S3b. Remaining connected components are identified as potential mark constituents S3c.

In the macro-detection operation S4, potential mark constituents in neighborhoods of other potential mark constituents that are over-populated or under-populated relative to a number of mark constituents MC defining a security mark SM are disregarded S4a. All remaining potential mark constituents that are not properly spaced from or arranged relative to their neighbor potential mark constituents are also disregarded S4b, and only those still remaining are identified as potential security marks S4c.

Thereafter, all potential security marks are further analyzed for uniformity, e.g., uniformity of color, uniformity of size, and those that are not sufficiently uniform are discarded S5a. Any remaining potential security marks are positively identified as actual security marks SM. If an actual security mark SM is identified, the image processing unit 14 prevents effective duplication of the document scanned on the image input scanner 12, e.g., by completely terminating the digital image processing operation, by inserting a "VOID" message or the like in the output data sent to the image output device 16, or by otherwise failing to output an exact replica of the input document, such as the currency note 20.

The operations S1–S6 will now be described in further detail with reference to the currency note 20. In accordance with the operation S1, the currency note 20 is scanned to obtain digital image data representing same in a suitable color space. This digital image data is fed to the image processing unit 14 for carrying out the operations S2–S6 in accordance with the present invention.

Figure 5A:
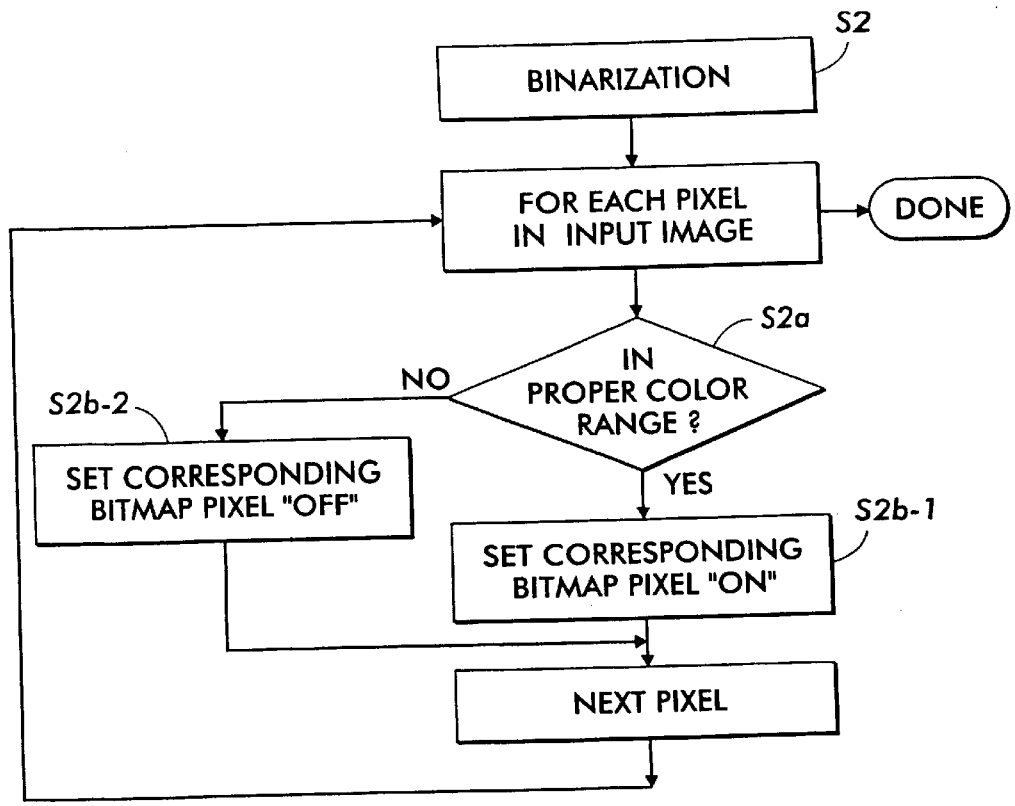
FIG. 5A is a flow-chart illustrating the binarization step of a digital image processing method for detection of document security marks in accordance with the present invention.
Figure 5B:
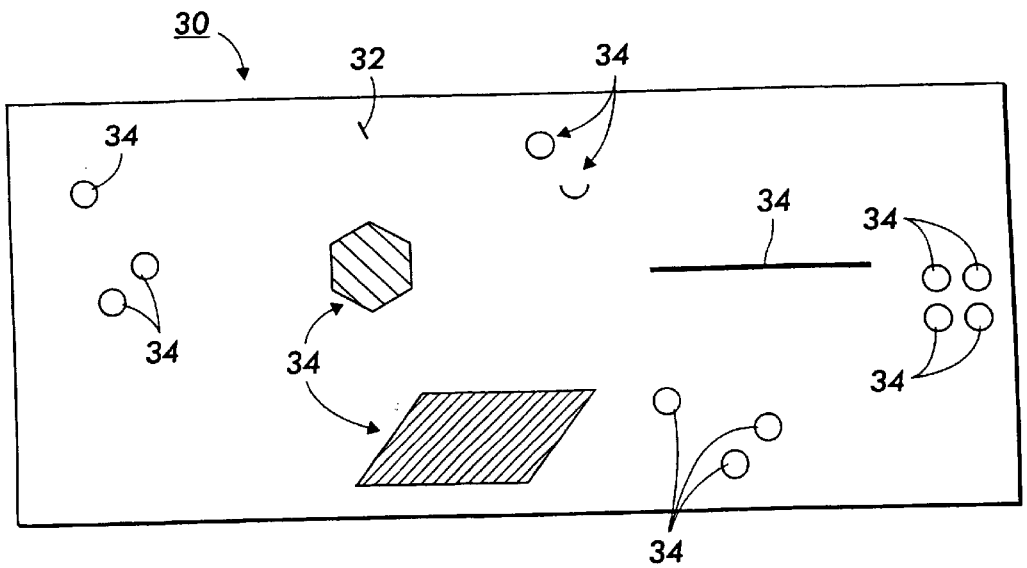
FIG. 5B illustrates the binary data resulting from application of the binarization method of FIG. 5A to the digital image data obtained from the printed document of FIG. 2A.

With reference to FIGS. 5A and 5B, the binarization operation S2 comprises constructing a bitmap 30 defined by a plurality of pixels corresponding respectively in location to the plurality of pixels defining the input digital image of the currency note 20. To construct the bitmap 30, the color of each pixel defined by the input digital image is examined by the sub-step S2a to identify each pixel having a color in a select range corresponding to the color used for the actual mark constituents MC in the security mark SM. For each pixel of input image data in the proper color range, a sub-step S2b-1 sets the correspondingly located pixel in the bitmap to 1 or "on." All other pixels in the bitmap are set to 0 or "off" by the sub-step S2b-2. Of course, an initialization sub-step may alternatively be used to set all pixels in the bitmap 30 "off" prior to the color-checking sub-step S2a. Using the binary digits "1" and "0" to represent "on" and "off" conditions corresponds with conventional computer science notation. Of course, the binary digits "0" and "1" may alternatively represent "on" and "off," respectively, and the invention is not intended to be limited to either notation.

Those of ordinary skill in the art will also recognize that many different methods exist for determining if a color of a pixel defined by values selected from a particular color space falls within a select color range, i.e., whether the color defined for a pixel in a particular color space is "close enough" to a desired color. If the distance of the actual color from the desired color is greater than a color range threshold T, then the actual color is outside of the range and not "close enough" to the desired color. For example, if the pixels of the input digital image representing the currency note 20 are each defined by the actual red, green, and blue values (R,G,B), and if a pixel of a desired color is defined by desired red, green, blue values (R', G', B'), then the distance of the color defined by the actual red, green, blue values R,G,B from the desired color defined by the red, green blue values (R',G',B') may be calculated and compared to the threshold T according to:

$$T \geq \sqrt{(R-R')^2 + (G-G')^2 + (B-B')^2}$$

Of course, those of ordinary skill in the art will recognize that alternative methods exist for determining whether a color value of a pixel of a digital image is within a select color range. The preferred method will vary depending upon the particular color space by which the pixel is defined. It is not intended that the present invention be limited to any particular color comparison method or any particular color space.

Referring now more particularly to FIG. 5B, the bitmap 30 resulting from binarization S2 of the input digital image derived by the scanner 12 for the currency note 20 is illustrated. For each pixel of the input digital image derived by the scanner that represents a color in a select color range encompassing the color used to print the security mark SM, the bitmap 30 is defined by a correspondingly located "on" pixel. One or more of these "on" pixels are generally identified at 34 in FIG. 5B. Likewise, all other pixels defining the bitmap remain or are set to an "off" condition. These "off" pixels are collectively identified at 32 in FIG. 5B. Accordingly, the bitmap 30 includes or identifies only those pixels from the input digital image that represent a color in the select color range that approximates the actual color of the constituents MC of the security mark SM.

Figure 6A:
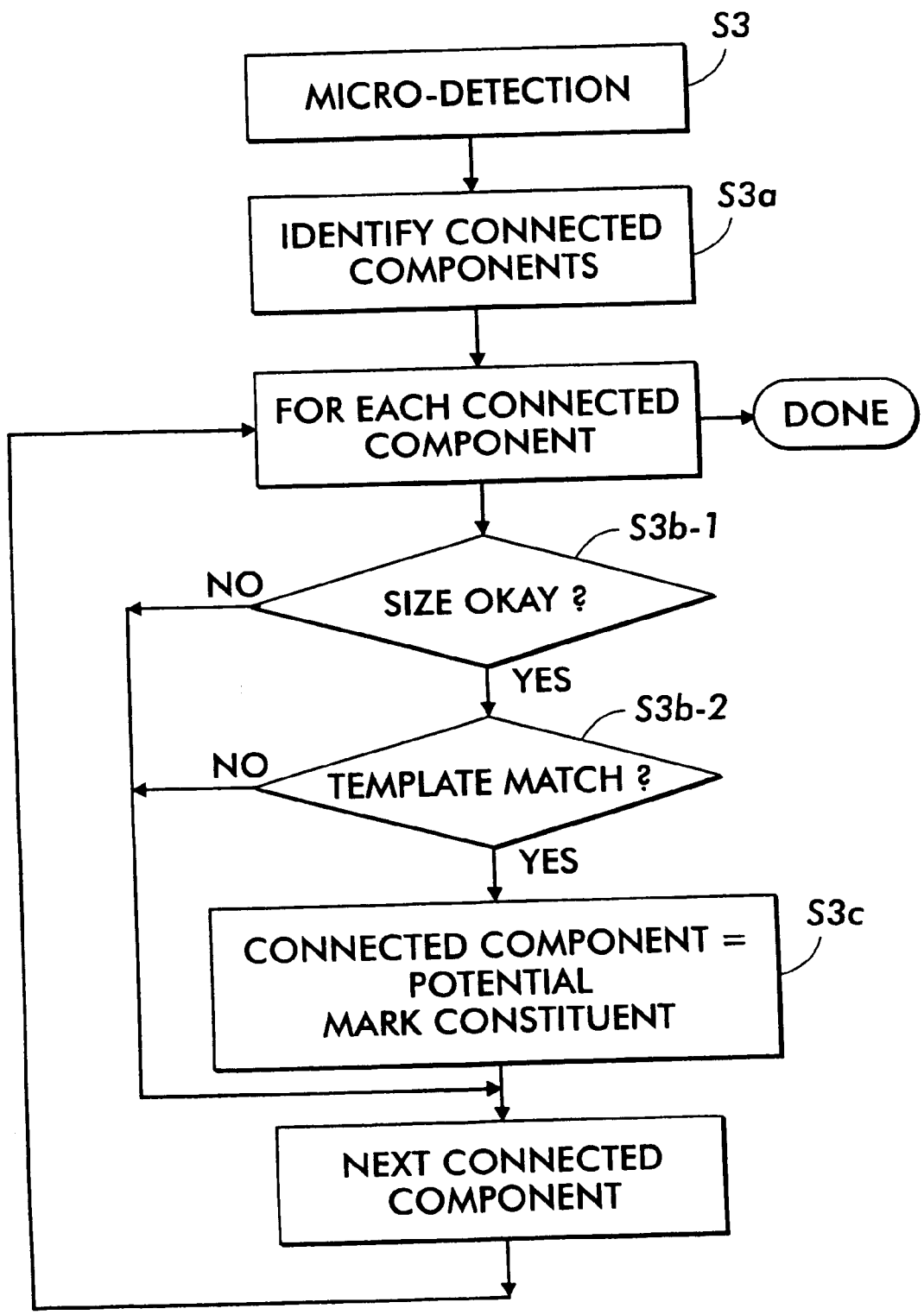
FIG. 6A is a flow-chart illustrating the micro-detection step of a digital image processing method for detecting document security marks in accordance with the present invention.
Figure 6B:
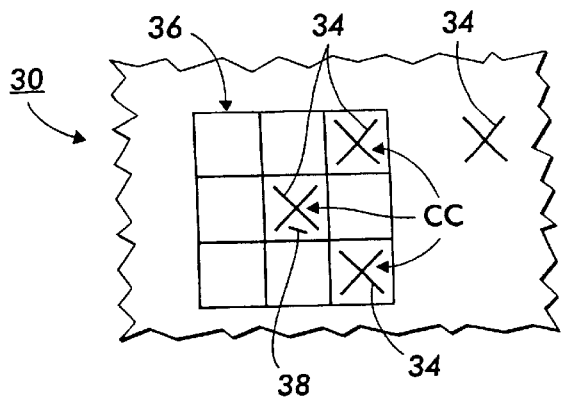
FIG. 6B diagrammatically illustrates a method of identifying connected components of binary image data in accordance with the present invention.

The bitmap 30 is further processed according to the micro-detection operation S3 as illustrated in FIGS. 6A–6D in accordance with the present invention. A first sub-step S3a identifies all "connected components" in the bitmap 30. The operation of identifying connected components, by itself, from digital image data such as the bitmap 30 is a conventional operation and well known to those of ordinary skill in the art of digital image processing, in particular, the art of optical character recognition (OCR). In the preferred embodiment illustrated herein, connected components in the bitmap 30 are identified as illustrated in FIG. 6B. Each "on" pixel 34 of the bitmap 30 is placed in the center cell 38 of a 3×3 pixel matrix 36. All other "on" pixels 34 encompassed in the matrix 36 are deemed to be part of the connected component CC including the pixel 34 in the central matrix cell or location 38. Therefore, each connected component CC of the bitmap 30 comprises a single "on" pixel 34 or a group of "on" pixels 34, wherein the pixels defining the group are each immediately adjacent to at least one other pixel in the group.

Figure 6C:
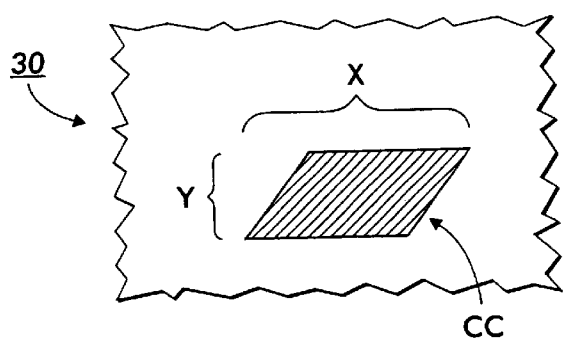
FIG. 6C diagrammatically illustrates evaluation of connected component size in accordance with the present invention.

Once each connected component CC in the bitmap 30 has been identified, each connected component CC is further examined by sub-steps S3b-1,S3b-2 to determine if the connected component is a potential mark constituent. Referring also now to FIG. 6C, the sub-step S3b-1 performs a size-checking operation on each connected component CC to determine if either its column width X or row height Y either (1) exceeds or (2) fails to meet the size of a mark constituent MC. If the connected component CC under consideration by the sub-step S3b-1 is too large or too small in either dimension, it is bypassed. Preferably, the size checking sub-step S3b-1 compares the width/height dimensions of each connected component CC to acceptable width/height size ranges rather than a select fixed value to account for printing, scanning, and other variations.

Figure 6D:
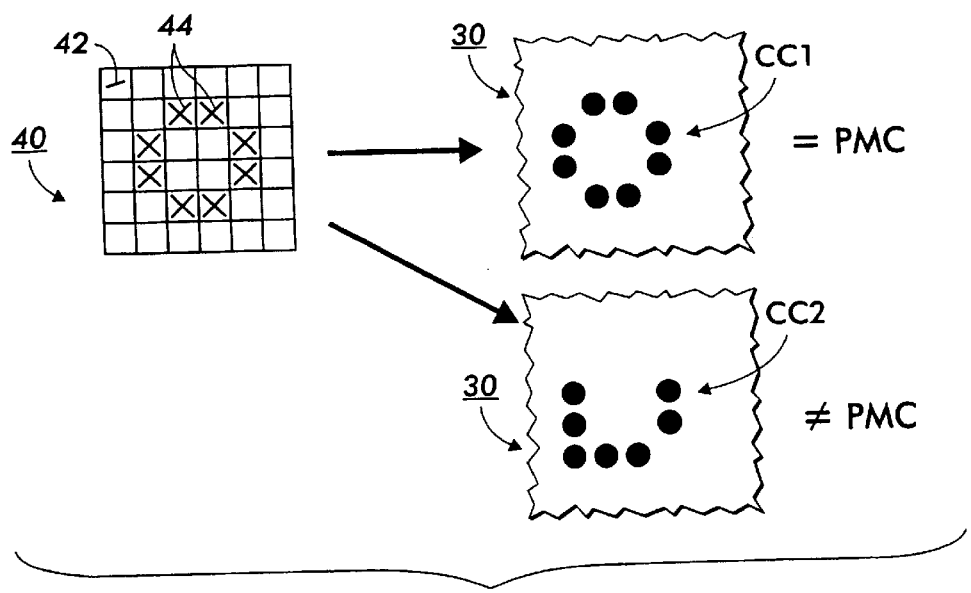
FIG. 6D diagrammatically illustrates a connected component template matching operation in accordance with the present invention.
Figure 6E:
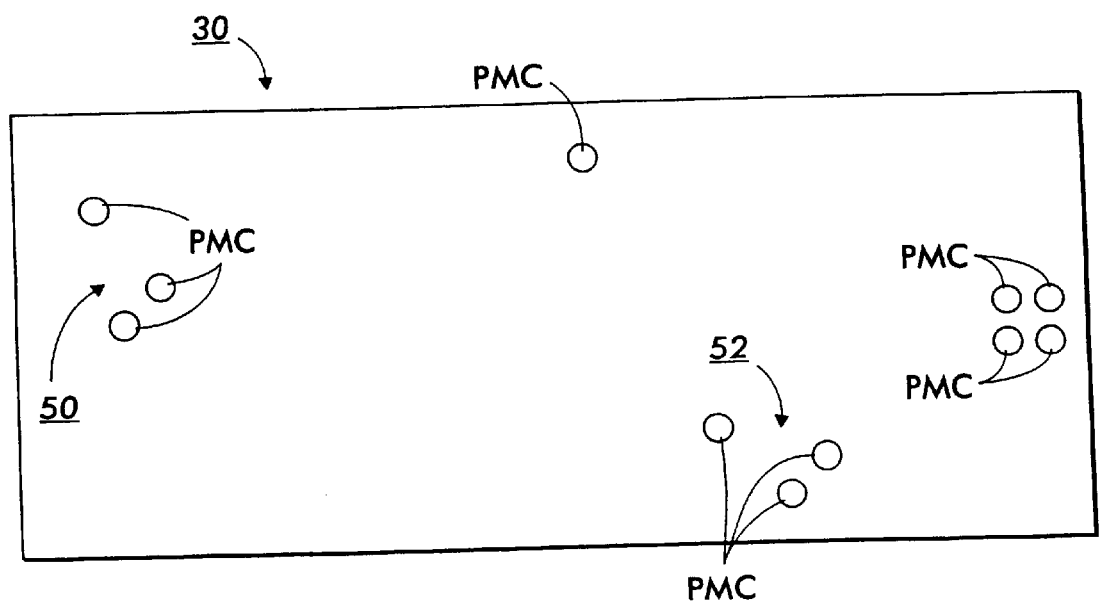
FIG. 6E illustrates the portions of the binary image data of FIG. 5B that correspond to potential constituents of a security mark in the printed document of FIG. 2A.

Each connected component CC that satisfies the size requirements of the sub-step S3b-1 must also survive a template-matching sub-step S3b-2 wherein the connected component CC is compared to and must match at least one template of an actual mark constituent in order for the connected component to be deemed a potential mark constituent b. This template-matching operation is diagrammatically illustrated in FIG. 6D. Both of the connected components CC1 and CC2 satisfy the size checking sub-step S3b-1. Thus, each is then compared to a template 40 including a plurality of cells 42. Certain cells 42 of the template 40 are target cells 44, arranged in the shape and size of a mark constituent MC. In order for a connected component CC1, CC2 to match a template, the template is overlaid with the connected component, and at least a select percentage of the target cells 44 must match or correspond to the pixels 34 defining the connect component CC1,CC2. Again, to account for printing, scanning, and other variations, a perfect template match is preferably not required. In FIG. 6D, the connected component CC1 matches the template 40, while the connected component CC2 does not. Accordingly, the sub-step S3c identifies only the connected component CC1 (and all other connected components that satisfy the template-matching operation S3b-2) as a potential mark constituent PMC as illustrated in FIG. 6E.

Figure 7A:
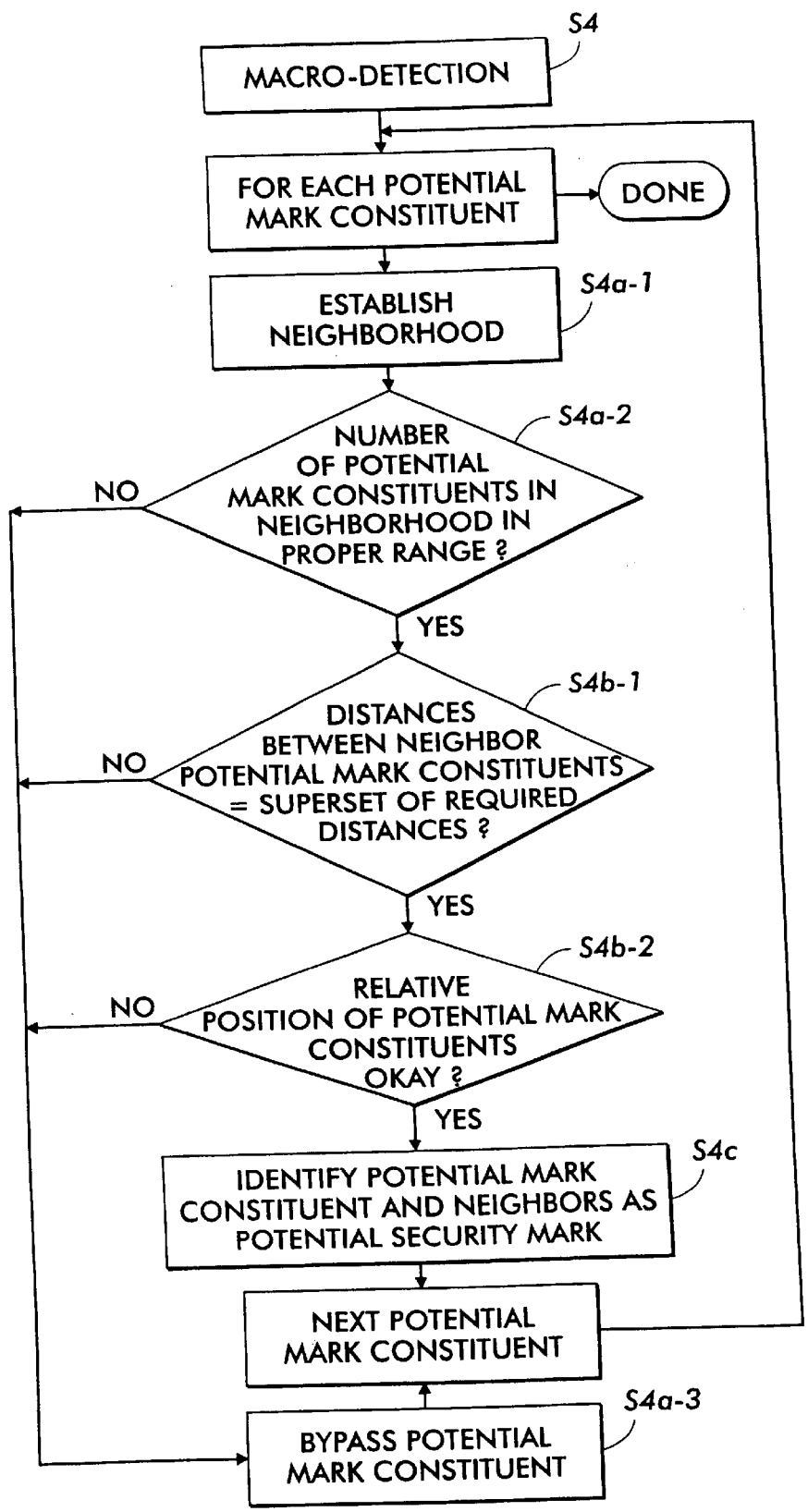
FIG. 7A is a flow-chart illustrating a macro-detection operation of a digital image processing method for detecting document security marks in accordance with the present invention.
Figure 7B:
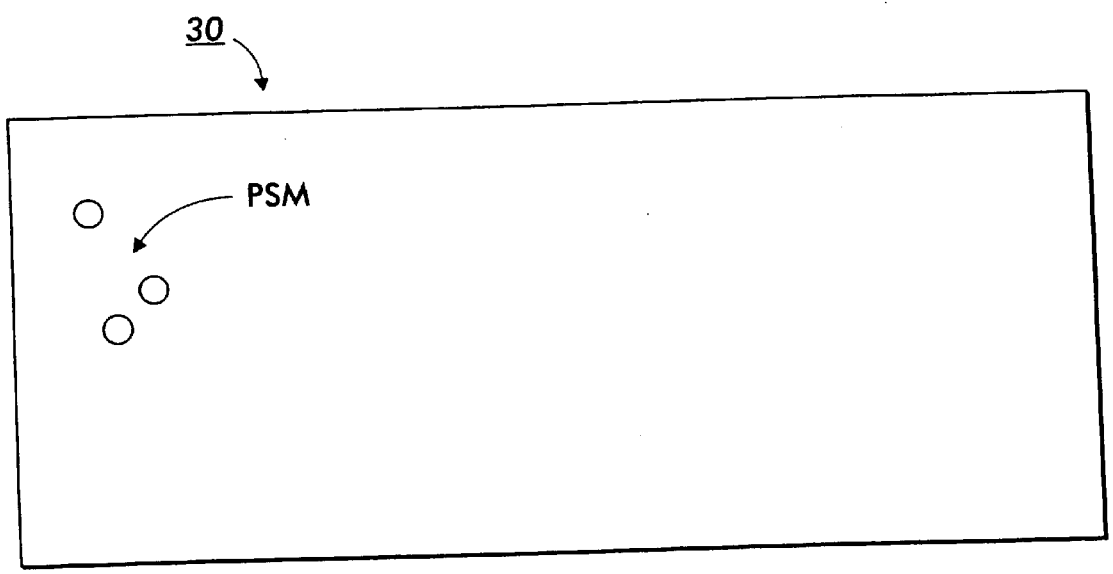
FIG. 7B illustrates the portions of the binary image data of FIG. 5B that correspond to potential security marks in the printed document of FIG. 2A.

Referring now to FIGS. 7A and 7B, the bitmap 30 is further processed according to the macro-detection operation S4 in an effort to determine which, if any, of the potential mark constituents PMC, with other potential mark constituents, defines a potential security mark PSM. As noted with reference to FIG. 2C, an actual security mark SM is defined by actual marked constituents MC arranged in a specific pattern and spaced from each other by the distances D1,D2,D3.

Using this information, which is obtained from the definition of the security mark SM, and for each potential mark constituent PMC, the sub-step S4a-1 establishes a neighborhood about the potential mark constituent having a radius equal to or minimally larger than the maximum of the distances D1,D2,D3. A sub-step S4a-2 determines the number of potential mark constituents PMC in the neighborhood, including the central or main potential mark constituent about which the neighborhood is established. The sub-step S4a-2 compares the number of potential mark constituents in the neighborhood to the number required to define a security mark. If a neighborhood has too many or too few potential mark constituents compared to the number required to define a security mark, a sub-step S4a-3 disregards or bypasses the potential mark constituent about which the neighborhood is based, and another potential mark constituent PMC is examined beginning at the sub-step S4a-1.

On the other hand, if the neighborhood established about a potential mark constituent PMC comprises the number of potential mark constituents required to define a security mark SM, the neighborhood is further examined by the sub-step S4b-1. Preferably, to account for the presence of "noise" potential mark constituents PMC, a neighborhood with one or two extra potential mark constituents relative to the number required to define a security mark SM is deemed to satisfy the sub-step S4a-2 so as to be further processed by the sub-step S4b-1 rather than discarded.

For neighborhoods having an acceptable number of potential mark constituents PMC, the sub-step S4b-1 determines the distances between each potential mark constituent and its neighbors. The sub-step S4b-1 then compares these distances to the predefined distances D1,D2,D3 of the security mark SM. The distances between potential mark constituents PMC in a neighborhood must equal or be a superset of the distances D1,D2,D3 plus or minus a margin of error to account for printing, scanning, or other variations. If not, the sub-step S4a-3 disregards or bypasses the potential mark constituent PMC about which the neighborhood is based, and the next potential mark constituent is examined beginning with the sub-step S4a-1.

However, if the distances between potential mark constituents PMC in a neighborhood equal or are a super-set of the distances D1,D2,D3, a sub-step S4b-2 discards any noise potential mark constituents PMC in the neighborhood and determines the position of the remaining potential mark constituents PMC in the neighborhood relative to each other and compares same to the relative position of the mark constituents MC defining an actual security mark SM. More particularly, the sub-step S4b-2 identifies and then discards noise potential mark constituents PMC from a neighborhood based upon the distances determined by the sub-step S4b-1. Any potential mark constituents PMC not relevant to the result of obtaining the distances D1,D2,D3 is deemed to be noise and discarded.

The sub-step S4b-2 determines the relative positions of the potential mark constituents PMC in a neighborhood, and compares same to the security mark SM using any other wide variety of methods. A preferred method, which operates independent of any rotation or other shift due to scanning variations at the image input scanner 12 is to use the distances as determined by the sub-step S4b-1. In such case, the potential mark constituents PMC in the neighborhood are examined to determine if the distances separating the potential mark constituents are arranged in the same sequence as the distances D1,D2,D3 of a security mark SM. Such a method operates independently of the vertical, lateral, or rotational placement of the potential mark constituents PMC in the bitmap 30. By way of example, two neighborhoods 50,52 (FIG. 6E) of potential mark constituents PMC satisfy the distance requirements of the sub-step S4b-1. However, when the sub-step S4b-2 examines the relative positions of the potential mark constituents PMC of each neighborhood 50,52, only the neighborhood 50 satisfies the requirement that the potential mark constituents PMC be positioned relative to each other as illustrated in FIG. 2C—with the distances D1,D2,D3 encountered sequentially when the potential mark constituents PMC are examined in a clockwise order. In an alternative embodiment, each potential security mark PSM is matched against a series of security mark templates, wherein the templates are devised so that, if the potential security mark represents an actual security mark, one template will be matched regardless of any rotational shift of the constituents of the potential security mark—i.e., the entire potential security mark will be compared to a template of an actual security mark, wherein the templates encompass every possible rotational arrangement in which the constituents of the potential security mark could define an actual security mark.

If a neighborhood does not satisfy the sub-step S4b-2, the sub-step S4a-3 bypasses the potential mark constituent PMC about which the neighborhood is established and another potential mark constituent PMC is processed beginning with the sub-step S4a-1. On the other hand, if a neighborhood satisfies the sub-step S4b-2, the sub-step S4c identifies the neighborhood as a potential security mark PSM (FIG. 7B), and processing in accordance with the macro-detection operation S4 continues at S4a-1 for the next potential mark constituent PMC not already part of a potential security mark PSM.

Figure 8:
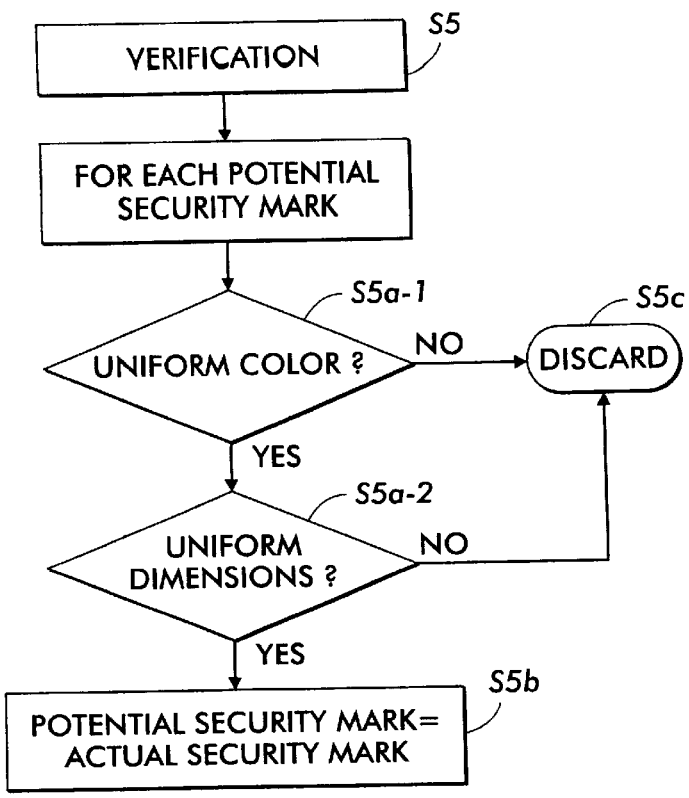
FIG. 8 illustrates a verification operation of a digital imaging method for detecting document security marks in accordance with the present invention; and, FIG. 9 is a flow-chart illustrating control of the digital image processing system to prevent effective duplication of a document including a security mark.
Figure 9:
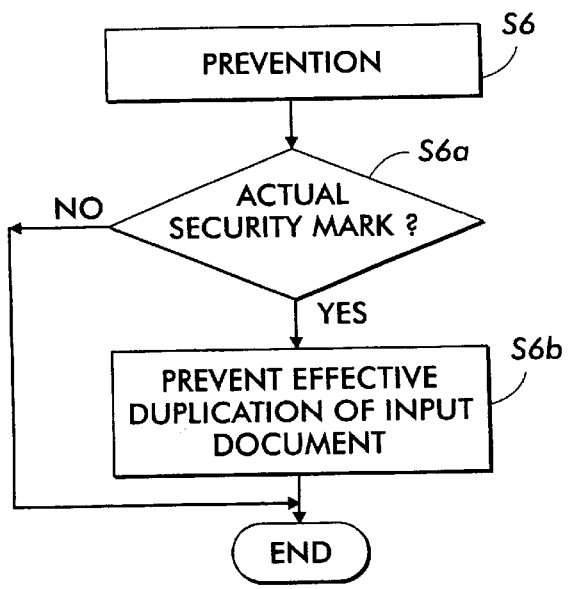

If the macro-detection operation S4 results in the identification of any potential security marks PSM, processing continues with a verification operation S5 in accordance with the present invention as illustrated in FIG. 8. Because the binarization S2, micro-detection S3, and macro-detection S4 operations all preferably rely upon "ranges" or otherwise allow some variation in connection with the identification of potential mark constituents and potential security marks in terms of color, size, shape, and the like, it is possible that one or more of the potential mark constituents PMC defining a potential security mark PSM are not actual mark constituents MC. Of course, in such case, the potential security mark PSM would not be an actual security mark SM. Thus, to ensure that a potential security mark PSM is an actual security mark SM, the potential security mark is subjected to a verification operation S5 in accordance with the present invention. More particularly, for each potential security mark PSM, a verification sub-step S5a-1 examines the color of each potential mark constituent PMC defining the potential security mark PSM, and determines if the color of each potential mark constituent is sufficiently close to or uniform with the color of the other potential mark constituents PMC defining the potential security mark PSM. It is preferred that the potential mark constituents have a color that is equal or close to each other. For example, if two potential mark constituents PMC have respective colors that fall within the color range used in the binarization color-checking sub-step S2a, but the respective colors thereof are found at extreme opposite ends of the acceptable color range, such potential mark constituents will not be deemed to exhibit sufficient color uniformity relative to each other to be actual mark constituents MC. Any potential security marks PSM not satisfying the color uniformity verification sub-step S5a-1 are discarded by the sub-step S5c.

For potential security marks PSM satisfying the color uniformity verification sub-step S5a-1, a dimensional uniformity verification sub-step S5a-2 examines the potential mark constituents PMC for dimensional uniformity relative to each other. The dimensional uniformity verification sub-step S5a-2 examines the column width and/or row height of each potential mark constituent PMC defining the potential security mark PSM for purposes of ensuring that the dimensions of the potential mark constituents are consistent relative to each other. Again, for example, if one potential mark constituent PMC exhibits dimensional characteristics relative to other potential mark constituents that vary by +/−5%, the potential mark constituent will fail the dimensional uniformity verification sub-step S5a-2, and the sub-step S5c will discard the relevant potential security mark PSM. If the potential mark constituents PMC defining a potential security mark PSM satisfy the verification operation S5, a sub-step S5B identifies the potential security mark PSM as an actual security mark SM.

Subsequent to the verification operation S5, a prevention operation S6 operates to prevent effective reproduction of the document scanned by the image input scanner 12. A sub-step S6a determines if an actual security mark SM has been identified as present in the document being scanned by the input scanner 12. If no security mark SM has been found, reproduction of the document is permitted. If, on the other hand, a security mark SM is identified, a prevention sub-step S6*b* prevents effective duplication of the document scanned by the input scanner 12. This is accomplished using one or more suitable prevention operations such as disabling the image output device 16, not sending output data from the image processing unit 14 to the image output device 16, embedding or otherwise including a message (such as VOID) in the image data sent to the image output device 16 so that the message is visible in the document reproduction, or by any other suitable method that prevents an effective reproduction of the document scanned by the input scanner 12.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, what is claimed is:

1. A digital image processing method for preventing unauthorized reproduction of a printed document including a security mark defined in terms of a plurality of actual mark constituents having a select color, select dimensions and arranged in a select pattern relative to each other, said method comprising:

a. scanning said printed document to derive color digital data representing said printed document, said color digital data defined in terms of a plurality of pixels each having a color value;

b. identifying all pixels of said color digital data having a color value representing a color at least approximating said select color of said plurality of actual mark constituents;

c. constructing a binary map of said color digital data defined in terms of "on" and "off" pixels, said "on" pixels corresponding to said identified pixels of said color digital data having color values at least approximating said select color of said plurality of actual mark constituents;

d. using said binary map, identifying potential mark constituents defined by said "on" pixels, said step of identifying potential mark constituents by said "on" pixels comprising:

processing said pixels of said binary map to identify groups of at least one adjacent "on" pixel and identifying each of said groups as a connected component;

comparing dimensions of each connected component to the predefined select dimensions of an actual mark constituent comprising the steps of:

comparing a width of the connected component to minimum and maximum width values of an actual mark constituent;

comparing a height of the connected component to minimum and maximum height values of an actual mark constituent;

only for each connected component having both a width encompassed by said minimum and maximum width values and having a height encompassed by said minimum and maximum height values, comparing the connected component to at least one template, said connected component identified as a potential mark constituent if said connected component matches said at least one template;

e. using said binary map, identifying at least one neighborhood of plural potential mark constituents together defining a potential security mark;

f. identifying said potential security mark as an actual security mark if said potential mark constituents thereof are uniform relative to each other; and g. preventing effective duplication of said printed document if an actual security mark is identified.

2. The digital image processing method as set forth in claim 1 wherein said step (f) of identifying an actual security mark comprises:

comparing all potential mark constituents of a potential security mark to each other and identifying a potential security mark as an actual security mark if the potential mark constituents defining the potential security mark are uniform relative to each other in terms of at least color and size.

3. A digital image processing method for preventing unauthorized reproduction of a printed document including a security mark defined in terms of a plurality of actual mark constituents having a select color, select dimensions and arranged in a select pattern relative to each other, said method comprising:

a. scanning said printed document to derive color digital data representing said printed document, said color digital data defined in terms of a plurality of pixels each having a color value;

b. identifying all pixels of said color digital data having a color value representing a color at least approximating said select color of said plurality of actual mark constituents;

c. constructing a binary map of said color digital data defined in terms of "on" and "off" pixels, said "on" pixels corresponding to said identified pixels of said color digital data having color values at least approximating said select color of said plurality of actual mark constituents;

d. using said binary map, identifying potential mark constituents defined by said "on" pixels;

e. using said binary map, identifying at least one neighborhood of plural potential mark constituents together defining a potential security mark, said step of identifying at least one neighborhood comprising:

establishing a neighborhood about the potential mark constituent;

counting the number of potential mark constituents located in the neighborhood;

comparing the number of potential mark constituents in the neighborhood to the number of potential mark constituents used to define an actual security mark; and identifying a neighborhood as a potential security mark only if the number of potential mark constituents therein is equal to or greater than the number of actual mark constituents required to define an actual security mark;

f. identifying said potential security mark as an actual security mark if said potential mark constituents thereof are uniform relative to each other; and g. preventing effective duplication of said printed document if an actual security mark is identified.

4. The digital image processing method as set forth in claim 3 wherein said neighborhood established about each potential mark constituent has a radius based upon a predefined maximum distance between any two actual mark constituents defining an actual security mark in said printed document.

5. The digital image processing method as set forth in claim 3 further comprising, prior to identifying a neighborhood as a potential security mark:
- determining the distances between potential mark constituents in said neighborhood; and
- identifying a neighborhood as a potential security mark only if the distances between potential mark constituents define a super-set of distances between actual mark constituents of an actual security mark in said printed document.

6. A document reproduction security method comprising:

scanning a printed document to derive color digital image data representative of said printed document;

processing said digital image data to identify all pixels thereof in a select color range used to define a security mark in said printed document;

processing said digital image data to identify all connected components comprising only pixels of said digital image data in said select color range;

processing said digital image data to identify as potential mark constituents all of said connected components having both a size and shape corresponding to a predefined size and shape of actual mark constituents defining said security mark in said printed document;

processing said digital image data to establish a neighborhood of a select size about each potential mark constituent and determining if a number of potential mark constituents in the neighborhood is greater than or equal to a minimum and less than or equal to a maximum number of actual mark constituents;

only for neighborhoods having greater than or equal to a minimum and less than or equal to a maximum number of potential mark constituents required to define a security mark, identifying the neighborhood as a potential security mark if the potential mark constituents in the neighborhood are arranged relative to each other in a manner corresponding to the actual mark constituents defining said security mark in said printed document;

for each neighborhood identified as a potential security mark, processing said digital image data to identify said potential security mark as an actual security mark if said potential mark constituents in said neighborhood are uniform in terms of at least size and color; and preventing effective reproduction of said printed document if said digital image data comprises an actual security mark.

* * * * *